United States Patent [19]
Alexander

[11] Patent Number: 4,738,460
[45] Date of Patent: Apr. 19, 1988

[54] SAIL DEVICE

[76] Inventor: Linc W. Alexander, 4559, West 11th Avenue, Vancouver, British Columbia, Canada, V6R 2M5

[21] Appl. No.: 17,907

[22] Filed: Feb. 24, 1987

Related U.S. Application Data

[63] Continuation-in-part of Ser. No. 774,942, Sep. 11, 1985, abandoned.

[51] Int. Cl.$^4$ ............................................. B62B 15/00
[52] U.S. Cl. .................................................... 280/213
[58] Field of Search ................ 280/213, 810; 180/2.2, 180/7.1; D12/114; 114/39, 102, 106, 107, 104, 105

[56] References Cited

U.S. PATENT DOCUMENTS

| | | | |
|---|---|---|---|
| 685,943 | 11/1901 | Pool | 114/39 |
| 1,438,246 | 12/1922 | Koelkbeck | 114/102 |
| 2,018,062 | 10/1935 | Hardt | 280/810 |
| 3,802,371 | 4/1974 | Jastrab | 114/39 |
| 3,836,176 | 9/1974 | Ylvisaker | 280/213 |
| 4,367,688 | 1/1983 | Godfrey | 114/39 |
| 4,418,632 | 12/1983 | Yoshimi et al. | 114/102 |
| 4,441,728 | 4/1984 | Schroeder | 280/213 |
| 4,546,718 | 10/1985 | Schwarz | 114/39 |

FOREIGN PATENT DOCUMENTS

| | | | |
|---|---|---|---|
| 75187 | 10/1893 | Fed. Rep. of Germany | 280/213 |
| 102888 | 5/1898 | Fed. Rep. of Germany | 280/213 |
| 1499954 | 9/1967 | France | 280/213 |

Primary Examiner—John A. Pekar
Attorney, Agent, or Firm—Fetherstonhaugh & Co.

[57] ABSTRACT

A sail device to be attached to the back of a bicycle rider. The device has a harness to permit attachment to the rider. A frame is attached to the harness and a further frame is pivotally attached to that frame. There is a control to control pivoting of the two frames. A sail is mounted on one frame and is movable between an extended position and a retracted position. The device has controls to extend and retract the sail.

26 Claims, 7 Drawing Sheets

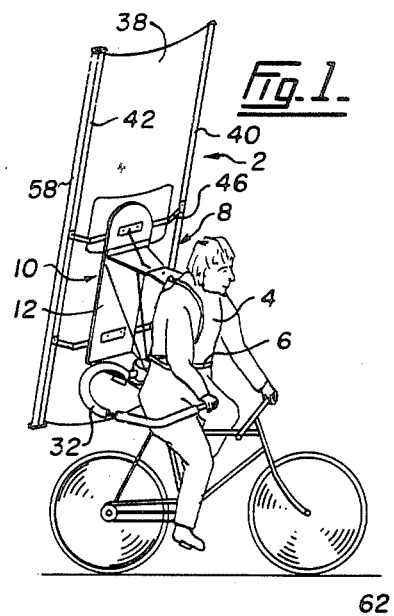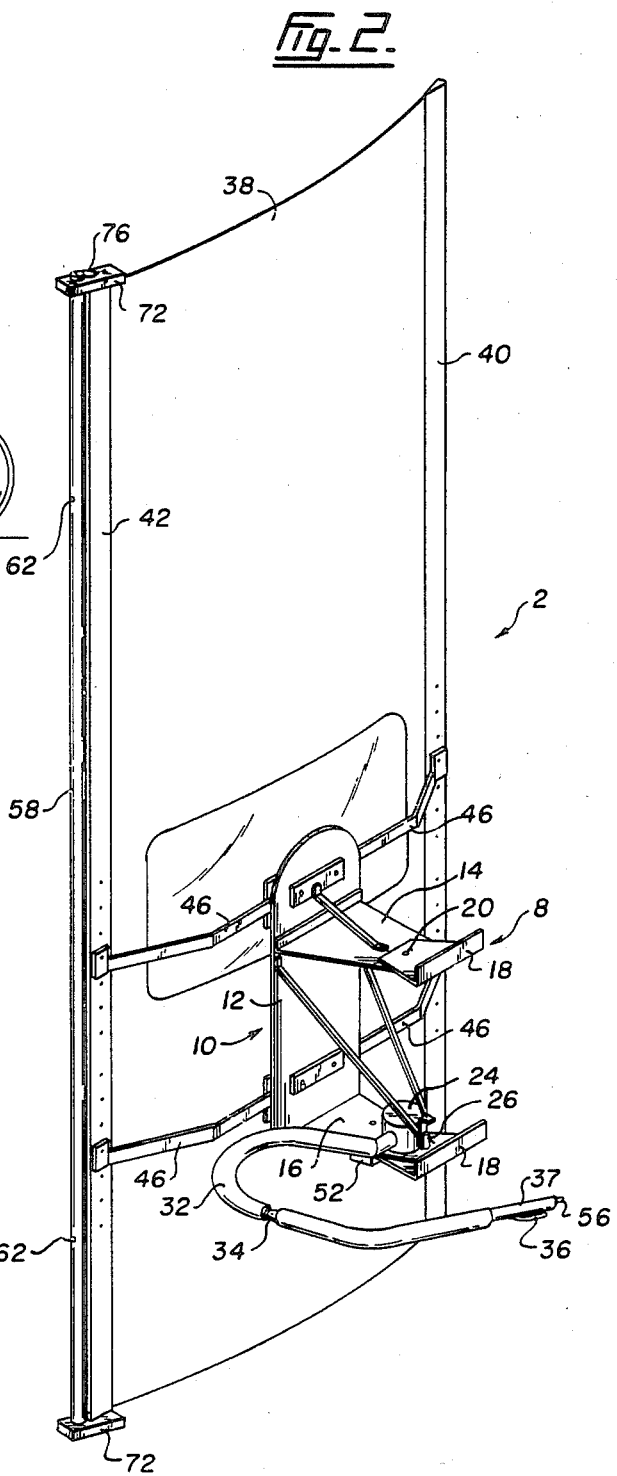

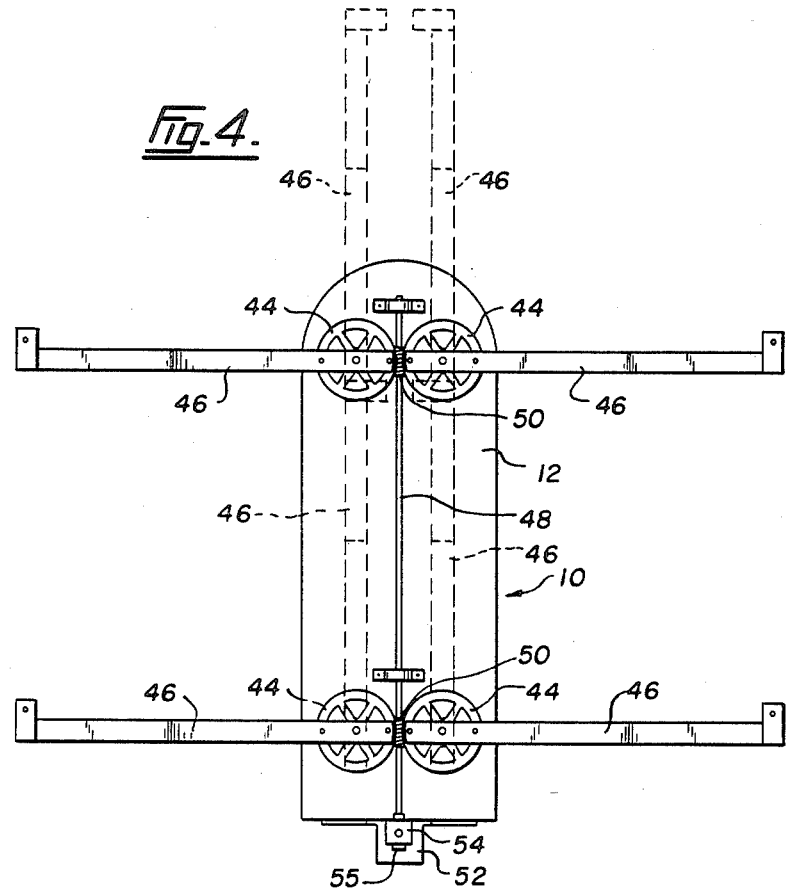

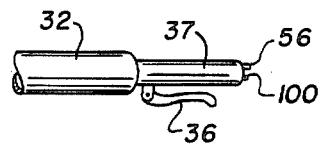
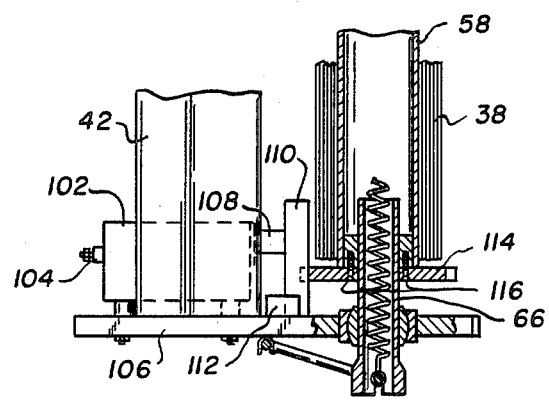
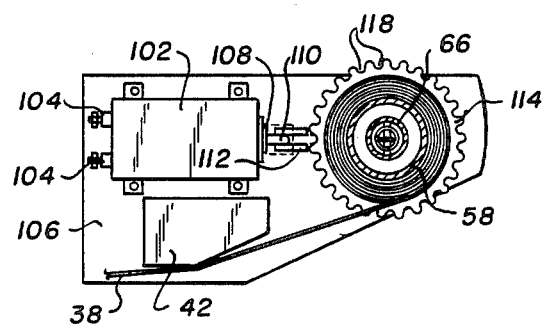

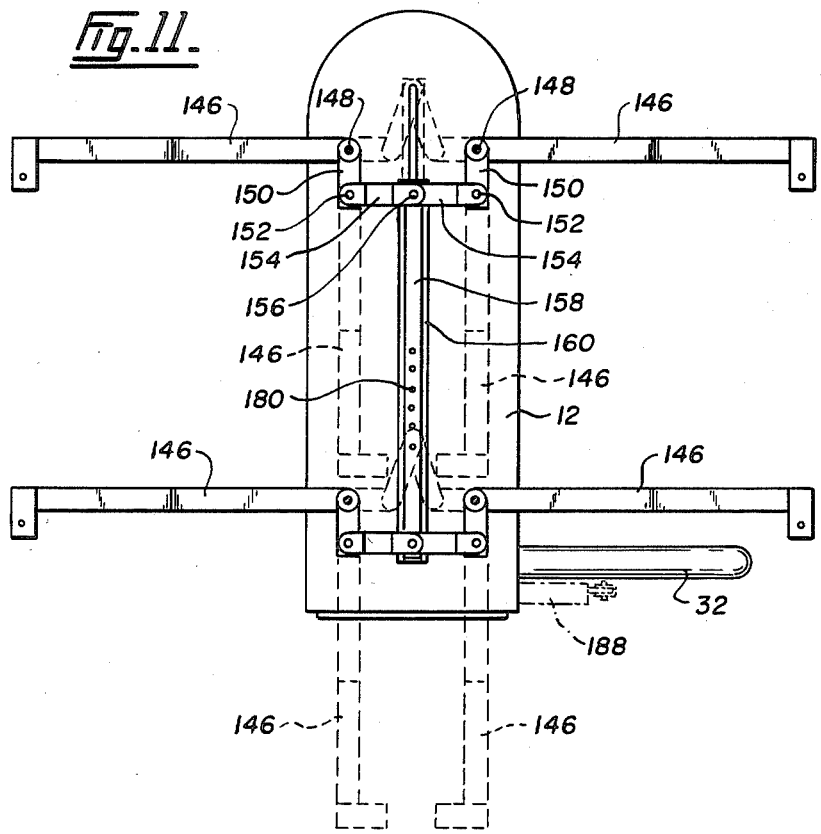
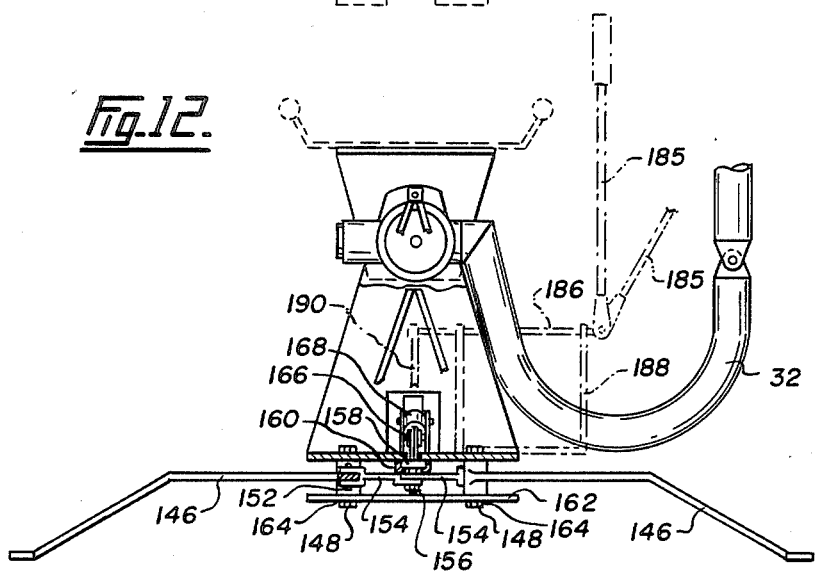

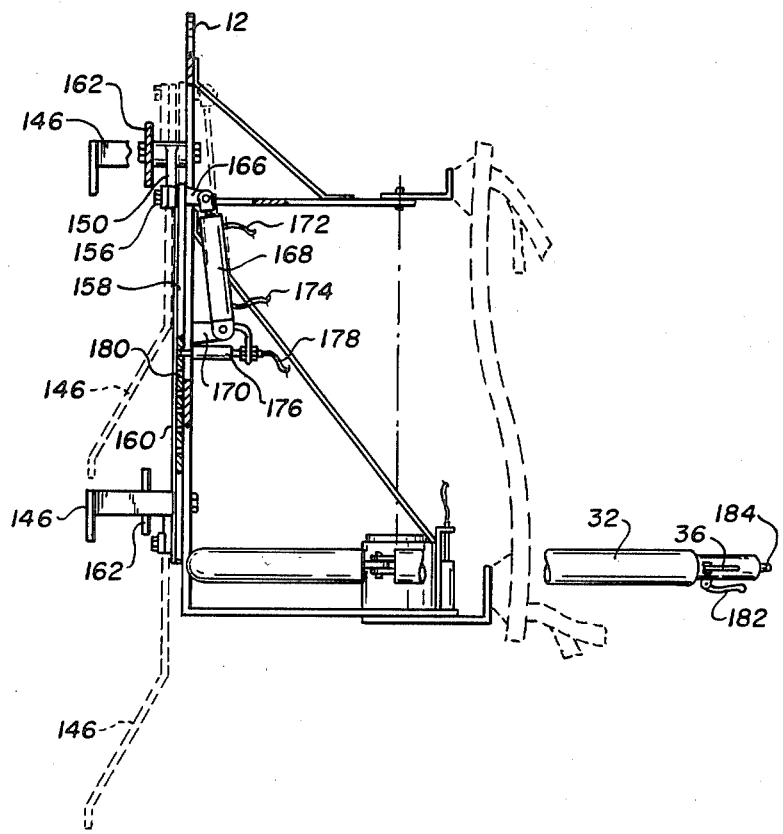
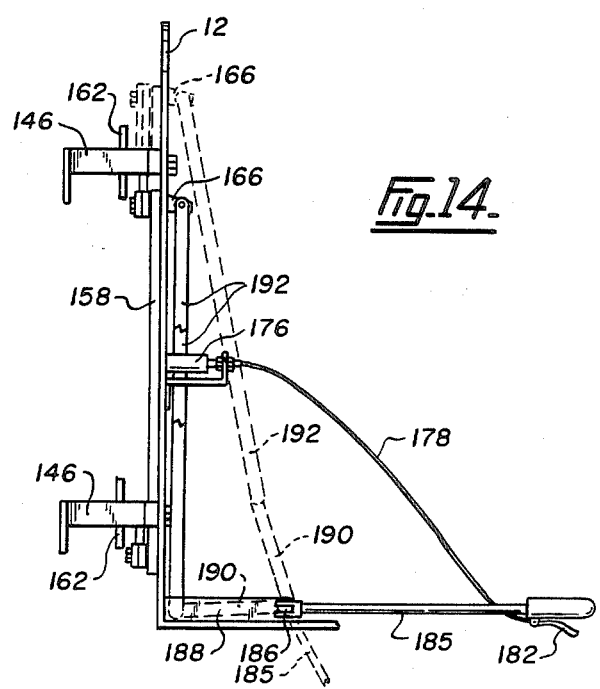

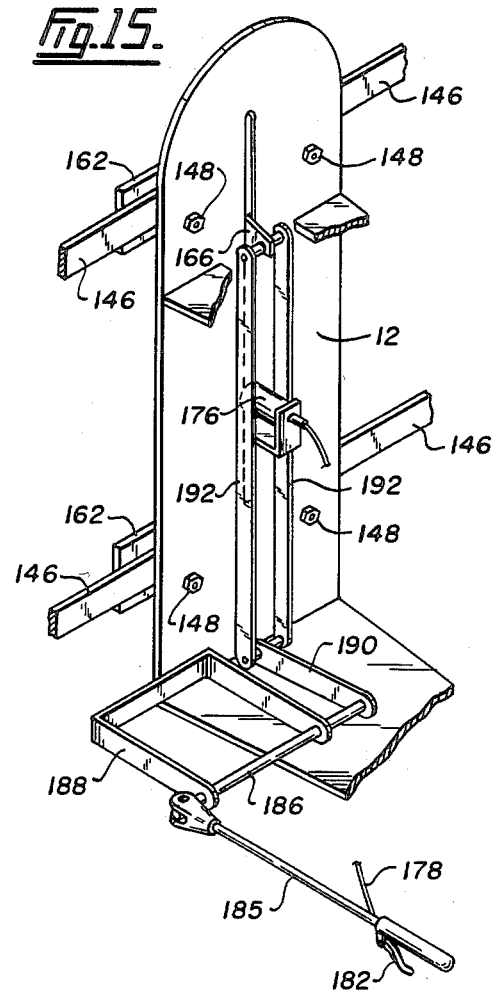

SAIL DEVICE

CROSS REFERENCE TO RELATED APPLICATION

This application is a continuation in part of copending application Ser. No. 774,942 filed 11th Sept. 1985 and now abandoned. The subject matter of application Ser. No. 774,942 is incorporated by reference.

FIELD OF THE INVENTION

This invention relates to a sail device adapted to be attached to the back of a bicycle rider.

DESCRIPTION OF THE PRIOR ART

There has been a marked increase in the popularity of cycling in North America in recent years. The sport has, of course, been very popular in Europe for much longer and in Asia is an important means of travel, particularly within cities.

Another sport that has achieved remarkable success in recent years, rising to the status of an Olympics sport in the 1984 Olympic Games in Los Angeles, is sail-boarding. In sail-boarding a sail is mounted on a hull resembling the hull of a surfboard by a universal joint. By control of the sail the sailor steers the craft.

SUMMARY OF THE INVENTION

The present invention seeks to combine the virtues of both sports. It provides wind power and, in particular, wind assistance to the cyclist, rendering the bicycle more useful, particularly in long distance travelling, and, in particular, reducing the effort necessary in cycling.

Accordingly the present invention is a sail device adapted to be attached to the back of a bicycle rider comprising a harness to permit attachment to the rider; a first frame attached to the harness; a second frame pivotally attached to the first frame; control means to control pivoting of the second frame relative to the first; a sail mounted on the second frame and movable between an extended position and a retracted position; and means to extend and retract the sail.

BRIEF DESCRIPTION OF THE DRAWINGS

Aspects of the invention are illustrated, merely by way of example, in the accompanying drawings in which:

FIG. 1 is an overall view of a sail device according to the present invention;

FIG. 2 is a more detailed view of the sail device according to the invention;

FIG. 3 illustrates a detail of the device of FIG. 2;

FIG. 4 illustrates a feature of the operation of the device;

FIGS. 8, 9 and 10 illustrate details of a modification of the device.

FIG. 11 is the rear view of a further embodiment of the present invention;

FIG. 12 is a plan view of a embodiment of FIG. 11;

FIG. 13 is a side elevation of the embodiment of FIGS. 11 and 12;

FIG. 14 is a side elevation of a further embodiment; and

FIG. 15 is a isometric projection of the embodiment of FIG. 14.

DESCRIPTION OF PREFERRED EMBODIMENTS

Referring particularly to FIG. 1 the drawings show a sail device 2 adapted to be attached to the back of a bicycle rider 4. The device comprises a harness 6 to permit attachment to the rider 4. Such a harness may simply comprise the strong nylon straps now well-known in, for example, backpacking.

Figure 5:
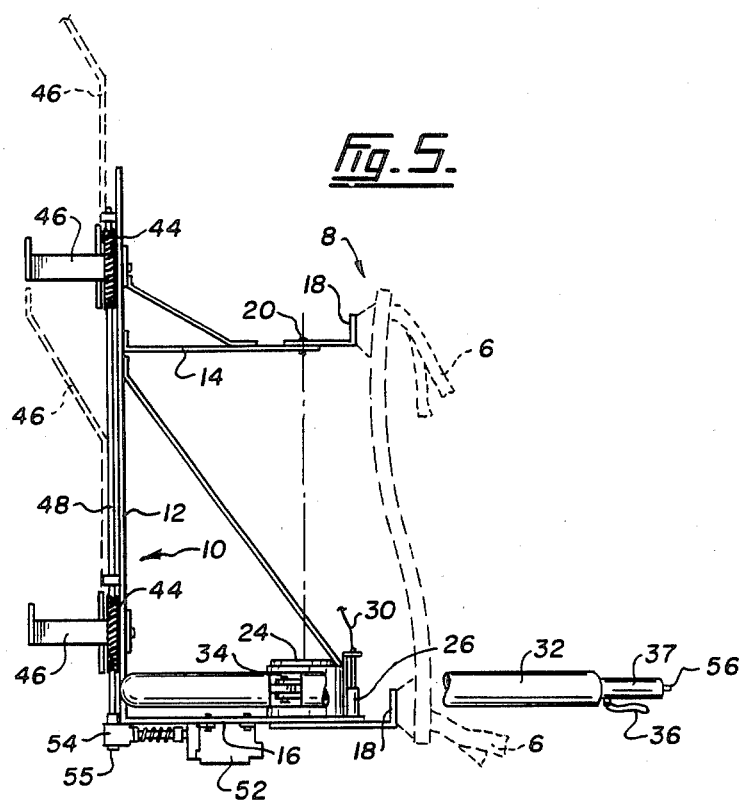
FIG. 5 is a side elevation of the device according to the present invention, without the sails.

There is a first frame 8, as perhaps shown most clearly in FIGS. 1, 2 and 5, attached to the harness. A second frame 10 is pivotally attached to the first frame 8. The second frame includes a main plate 12, disposable generally parallel to the back of the rider 4 when in use, as shown in FIG. 1. There are first and second extensions 14 and 16 extending from the plate 12 to the first frame 8. Corresponding extensions 18 extend from the first frame 8 and there are pivoting connections between the extensions 18 of the first frame 8 and those of the second frame 10. The pivotal attachment of the second frame to the first is by an upper pin 20 and by a lower pin 22, received within housing 24 and shown in FIG. 3. Housing 24, is attached to the over extension 16 of the second frame 10. A locking pin 26 is mounted on the lower extension 16 of the second frame 10. A plurality of recesses 28 are formed in the first frame 8—see FIG. 3—and the locking pin 26 can be engaged at the will of the rider in a recess 28 to control the trim of the device relative to, for example, wind direction. The locking pin 26 is movable by a flexible cable 30. The flexible cable 30 is mounted within a swing arm 32, attached to housing 24, and movable to suit the bicycle rider 4. Swing arm 32 is pivotally received within a bushing 33—see FIG. 3—extending through housing 24 and allowing pivoting of arm 32 about a generally horizontal axis. Arm 32 extends from the pivotable joint in the lower extension 16 of the second frame outward and forward, as shown particularly in FIGS. 1 and 3, to the hand of the bicycle rider 4. A pivotable joint 34 is provided in the swing arm 32 to facilitate the positioning of the arm 32. Thus arm 32 can pivot about the generally horizontal axis of bushing 33 and about the generally vertical axis of joint 34. There is a control lever 36 at the forward 37 end of the swing arm 32, attached to the flexible cable 30 in the manner, for example, of a handbrake on a bicycle, so that depression of the control lever 36 raises the pin 26. The swing arm 32 may then be moved until the pin 26 aligns with another recess 28 in the first frame 8, the lever 36 is then released and the pin 26 engages in a different, recess 28. The pin 26 is spring-loaded to be urged towards an opening 28, that is downwardly in the drawings, so that release of the control lever 36 is sufficient to allow reengagement of the pin 26 in an opening 28.

There is a sail 38 mounted on the second frame 10, movable between a retracted and extended position. This is made possible by the provision of masts 40 and 42 connected to frame 10. Masts 40 and 42 are located in the plane and movable in that same plane between a first position, close to each other, to a second position, remote from each other to retract and extend the sail. Such movement is accomplished by the provision of rotatable gears 44 mounted on the second frame 10. There are arms 46 extending from each gear and rotatable with the gears 44. The arrangement is illustrated in FIG. 4 where the extended position for the sail is shown in solid lines and the retracted position in broken lines. For clarity in FIG. 4 the sail is omitted.

There is a drive shaft 48 mounted on the second frame 10 with drive gears 50, in the form of worm gears, to engage the rotatable gears 44. The arrangement is such that rotation of the drive shaft 48 rotates the worm gears 50, and thus the rotatable gears 44, to move the arms 46 from the broken line position in FIG. 4 to the solid line position in FIG. 4, thus extending the masts 40 and 42 and thus extending the sail. In the illustrated embodiment, as shown in FIG. 5, an electric motor 52 is mounted on the first extension 16 and is attached at gear box 54 to the drive shaft 48. According to a desirable feature of the invention a hand crank 55 is provided for rotation of the shaft 48, in particular for retraction of the sail 38, if the electric motor 52 fails.

Operation of the electric motor is by a simple three position toggle switch 56 attached to the swing arm 32 as shown in FIG. 3. The three positions for the switch 56 are extend, retract and off. Power for the electric motor may be provided by a battery mounted on the frame of the bicycle.

As shown particularly in FIG. 2 the sail 38 is attached to one mast 40 but passes over the second mast 42 and is attached to a reefing mechanism that is attached to the second mast 42 to reef the sail 38 on its retraction. As shown particularly in FIG. 2 the masts 40 and 42 are desirably of aerodynamic configuration, having a rounded outer surface and tapering inwardly.

Figure 6:
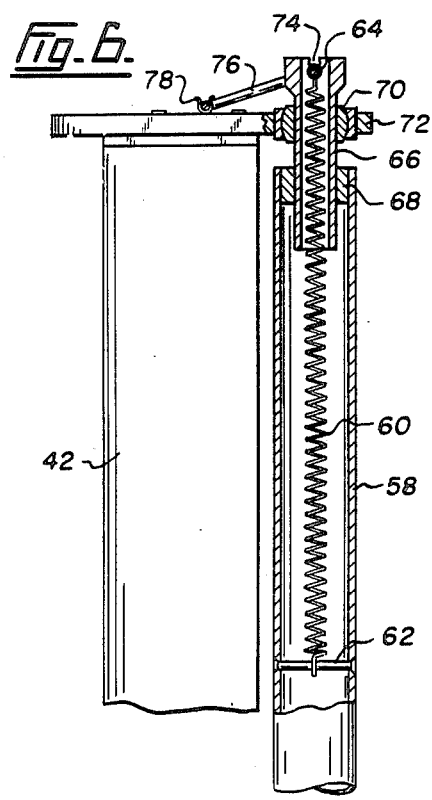
FIG. 6 is a detail of an important feature of the sail device.
Figure 7:
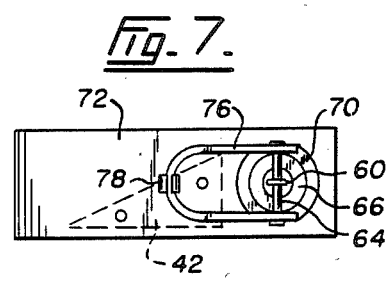
FIG. 7 is a plan view of FIG. 6.

The reefing mechanism is shown most clearly in FIGS. 6 and 7. It comprises a first tube 58 that is rotatable relative to the mast 42. In this regard it should be emphasized that FIG. 6 shows only one end of the first tube 58 but, in fact, the other end of the tube 58 is precisely the same. A coil spring 60 is located within the first tube 58 and is anchored at its inner end by pin 62 that is fixed relative to the first tube 58 and must rotate with the first tube 58. At its outer end the spring 60 is mounted on a pin 64, as shown particularly in FIG. 7. The arrangement is such that rotation of the first tube 58 coils and uncoils the spring 60. At the outer end of the reefing mechanism there is a second tube 66 slidably located within the first tube 58 by bearing 68. The second tube 66 is also received within rose joint 70 that is attached to plate 72, in turn attached to the top of the mast 42. The outer end of the second tube 66 is slotted at 74 to receive the pin 64 for the coil spring 60. This arrangement of the two tubes 58 and 66 being slidable relative to each other and the rose joint 70 permitting movement of the second tube relative to the first, means that when the masts 40 and 42 are flexed in the wind, and it must be remembered that the structure is intentionally light-weight, the straight line distance between the ends of the masts decreases. This decrease in distance and the misalignment of the mast ends caused by flexing is compensated for by the sliding fit of the second tube 66 within the bearing 68 within the second tube 58 and by rose joint 70.

It is desirable to pretension the coil spring. Accordingly, as shown particularly in FIG. 7, the pin 64 is attached to a U-bracket 76 that is anchored, for example in a spring clip 78, on the plate 72 on the mast 42. The U-bracket 76 can be removed from the clip 78, the second tube 66 rotated relative to the first 58 by turning U-bracket 76 to pretension the spring 60 and the bracket 76 then relocated within clip 78.

The arrangement of the reefing mechanism, as is believed to be clear from FIG. 6, is such that extension of the sail 38 coils and tensions the spring 60. When the masts 40 and 42 are brought together, by reversing the electric motor 52, the resulting slack in the sail 38 is removed by the tension in the spring 60 causing the tube 58 to rotate to windup the sail.

Although not shown limit switches are provided to stop the motor 52 when the masts reach their maximum outward extension and inward retraction.

To operate the device according to the present invention with the sails retracted the harness is strapped to the back of the rider who mounts the bicycle. The rider may cycle along or may extend the sail at rest. In any event switch 56 is operated to permit power to pass to the electric motor to extend the sails by rotating shaft 48. Once the sail 38 is extended the obvious advantage of wind assistance in cycling is achieved. Furthermore the trim of the sail can be adjusted by releasing lever 36, moving the swingarm 32 to control the trim of the sail, releasing the lever 32 so locking pin 26 may reengage in an opening 28 and fixing the relative position of the frames and thus the trim of the sail to the wind.

Upon retraction, the operation of the motor 52 in the reverse direction moves the arms 46 towards each other as the gears 44 rotate. Simultaneously the reefing tube can rotate, under the influence of the spring to gather in the sail to effect neat storage.

The present invention thus provides an efficient means of facilitating bicycle travel. The mounting of the device on the back of the bicycle rider has been found to be of major significance. The rider, once skilled, can vary the inclination of the sail, simply by bending his back, and thus reduce the affects of gusting, which, in the inventor's experience, is not possible when the sail is mounted directly to the bicycle.

It should be noted that the sail can pivot to both sides of the rider, pivoting about pins 20 and 22. This is very important to provide proper control in all winds, from all directions. The provision of pivoting for arm 32 about bushing 33 and joint 34 ensures the control of trim is equally easy when the sail is on both sides of the rider. The pivots allow the forward end 37 of swing arm 32 to be in the position shown in FIG. 1 when the sail is on the rider's left. The end 37 is in front of the rider, projecting forwardly, when the sail is on the right of the rider. This forward projection of end 37 is made possible by joint 34. For a left-handed rider the arm 32 would extend from the other side of the housing 24 from that shown in FIG. 2.

It is, of course, also possible simply to extend the sail partway, again entirely at the discretion and experience and skill of the operator. Locking of the sail at any partially extended position is achieved by the known expedient of cutting the gears 44 and 50 at an angle so that, as viewed in FIG. 4, the teeth are not horizontal but at an angle of up to 18° to the horizontal. An angle of about 11° has been used.

A disadvantage of the above embodiment of the invention is that in strong winds the roller reefer mechanism can, when the sail is anything less than fully deployed, unwind too much fabric and spoil the proper shape of the sail. FIGS. 8, 9 and 10 illustrate a means of avoiding this problem. First FIG. 8 simply shows the addition of a further switch 100 at forward end 37 of swing arm 32. FIGS. 9 and 10 show the provision of a solenoid 102 having connections 104 from a power supply and mounted on a plate 106 at the end of mast 42.

Solenoid 102 has a shaft 108 that extends under the influence of an internal spring (not shown) when the solenoid is de-energized. Such operation of a solenoid is, of course, entirely conventional.

Shaft 108 is fitted with a catch 110. Plate 106 is provided with a guide track 112 for the catch 110. As shown particularly in FIG. 9 catch 110 is of considerable height.

A wheel 114 is attached to second tube 66 and is prevented from turning on the shaft by the provision of screws 116. As shown in FIG. 10 the wheel 114 has a plurality of indents 118. A sprocket wheel is appropriate.

The wiring is solenoid 102, through connections 104, is such that when the three-way switch 56 is moved to either the extend or retract position the solenoid is energized automatically and the catch 110 retracted out of engagement from wheel 114. Thus the solenoid 102 does not interfere with the operation of the device. However, when switch 56 is moved to the off position power is cut off from the solenoid 102 and catch 110 therefore moves outwardly, under the influence of the internal spring, to engage the wheel 114 to prevent rotation of the reefer mechanism. By this means the wind cannot extend the sail when the operator does not wish the sail to be extended.

Switch 100 is a two-way switch having an off and an on position. It is able to control the electric motor 52 but can only do so to retract the sail. This provides the operator with fine control. When the sail is fully extended it may be too flat, that is some bowing of the sail is desirable. This bowing is achieved by extending the sail to the desired position then moving the switch 100 to energize the motor 52, with wheel 114 locked by catch 110 to move the masts together. This permits the operator to select whichever depth of sail the desired depending on how much the masts are returned together.

The illustrated catch 110 is relatively long. This is so that it can accommodate movement of the roller reefer. As indicated above the roller reefer moves during deployment and retraction and the long catch insures engagement with the wheel 114 anywhere on the travel of the roller reefer.

The guide 112 ensures that the catch will not rotate on the solenoid plunger 110 if the plunger is well up on the catch.

A further embodiment of the the present invention is shown in FIGS. 11 to 13 and yet a further embodiment, which may be considered a variation of embodiment of FIGS. 11 to 13, is shown in FIGS. 14 and 15. The particular virtue of the embodiments of FIGS. 11 to 15 is the ability of the arms 146 (equivalent to arm 46 in the preceding drawings) to retract downwardly, not upwardly, as in the previous embodiments. To enable this FIGS. 11 to 15 show arms 146 mounted pivotably at 148 to first levers 150, in turn mounted pivotably at 152 to second levers 154. Those levers, in turn, are pivotably mounted at 156 to a slider 158 located in a track 160, shown most clearly in FIG. 12. A cover plate 162 located by bolts 164 protects the mechanism.

The slider 158 has an arm 166 extending forwardly and attached to a pneumatic cylinder 168, shown most clearly in FIG. 13, which is pivotably located on a fixed bracket 170 attached to plate 12. An air supply, which may be a cylinder mounted on the frame of the bicycle, and is not shown in the drawings, is connected to the pneumatic cylinder, which is double acting, at lines 172 and 174. There is a locking pin 176, actuated by cable 178 and is able to engage in openings 180 in the slide 158 to prevent movement of the slide. The operation is by lever 182 mounted on the swing arm 32. A switch 184 to operate the air supply is also mounted on the swing arm 32.

The arrangement is such that the application of air pressure to extend cylinder 168 moves the arms 146 upwardly to retract the sails. By moving the rod of the cylinder 168 downwardly the sails are extended. The slider position, and thus the position of the sails, is locked by the pneumatic cylinder when air pressure is stabilized on each side of the piston of the cylinder. However, locking pin 176 engaging an opening 180 acts as a back-up.

In the embodiment of FIGS. 14 and 15 a functionally equivalent arrangement is used except that there is no pneumatic cylinder and the linkages are simple mechanical linkages comprising a hand lever 185 pivotably attached to a torque tube 186. The torque tube 186 is located in a frame 188 and is attached to a lever 192 that, in turn, is attached to spaced limbs 196 attached pivotably at their upper ends to an arm 166 precisely as in the embodiment of FIGS. 11 to 13. FIG. 15 shows lever 182 attached to the cable 178, attaching to pin 176. Lever 182 is attached in this embodiment to handle 185. The spaced arms 191 are used simply to avoid the pin structure 176. Locking of the sails is by pin 176 only.

The embodiments of FIGS. 14 and 15 have the same advantages as that of FIGS. 11 to 13, namely as the sails retract they move downwardly.

The advantages of the embodiment of FIGS. 11 to 13, in its downward retraction, is that the central thrust is lowered, not lifted, with increasing wind, that is as the rider retracts the sails. This reduces or eliminates any tipping tendency as the central thrust approaches the hub of the rear wheel, which may be considered the pivot point of any tipping that would be taking place.

I claim:

1. A sail device adapted to be attached to the back of a bicycle rider comprising:
   a harness to permit attachment to the rider;
   a first frame attached to the harness;
   a second frame pivotally attached to the first frame;
   control means to control pivoting of the second frame relative to the first;
   a sail mounted on the second frame and movable between an extended position and a retracted position, the sail being mounted on a pair of masts connected to the second frame and located in substantially the same plane and movable in that same plane between a first position, close to each other, to a second position, remote from each other, to retract and extend the sail, the sail being attached to one mast and the masts always remaining in substantially the same plane;
   a rotatable reefer mechanism attached to the sail and to the other mast to reef the sail on its retraction; and
   means to extend and retract the sail;
   the reefer mechanism being spring loaded whereby movement of the masts to the second position to extend the sail rotates the mechanism to tension the spring, subsequent movement of the mast to the first position relieving the tension in the spring to rotate the reefer mechanism to reef the sail.

2. A device as claimed in claim 1 in which the second frame includes a main plate disposable generally parallel to the back of the rider when in use;
   first and second extensions extending from the main plate to the first frame; and
   pivotal connections between the extensions and the first frame.

3. A device as claimed in claim 2 having a locking pin mounted at one pivotable joint;
   a plurality of recesses alignable with the locking pin so that engagement of the locking pin in a recess prevents pivoting of the first and second frames by locking the first and second frames in a predetermined position.

4. A device as claimed in claim 3 including a flexible cable attached to the locking pin;
   a swing arm, movable to suit the bicycle rider, extending from said one pivotable joint, outward and forward to the hand of the bicycle rider when in use;
   a control at the forward end of the swing arm attached to the flexible cable to permit retraction of the locking pin;
   whereby the pin may be retracted, the second frame pivoted and the pin extended to lock the second frame in the new position, relative to the first frame.

5. A device as claimed in claim 4 in which the locking pin is mounted in an extension of the second frame with the plurality of recesses being positioned in the first frame.

6. A device as claimed in claim 4 in which the swing arm includes two pivotable joints whose pivotal axes are perpendicular to each other to facilitate control in moving the control relative to the hand of the rider.

7. A device as claimed in claim 1 including rotatable gears mounted on the second frame;
   arms extending from each gear to each mast and rotatable with the gears;
   a drive shaft mounted on the second frame;
   drive gears on the drive shaft to engage the rotatable gears; whereby rotation of the drive shaft rotates the drive gears, and thus the rotatable arms, to separate the masts to extend the sail.

8. A device as claimed in claim 7 including an electric motor to drive the drive shaft to extend the sail.

9. A device as claimed in claim 8 including a switch mounted on a swingable arm to control the electric motor.

10. A device as claimed in claim 7 including a hand crank for extension and retraction of the sail if the electric motor fails.

11. A device as claimed in claim 1 in which the reefing mechanism comprises a first tube rotatably mounted relative to said other mast to receive the sail;
    a coil spring at each end of the first tube;
    each coil spring being mounted within the tube at its inner end and anchored outside the tube at its outer end, whereby rotation of the tube coils and uncoils each spring.

12. A device as claimed in claim 11 in which the inner anchor for each coiled spring is an inner pin extending through the first tube.

13. A device as claimed in claim 12 in which the anchor for each outer end of each coiled spring is an outer pin non-rotatable relative to said other mast.

14. A device as claimed in claim 13 in which the outer end comprises a second tube slidably received within the first tube;
    a rose joint attached to said other mast and receiving the second tube;
    a slot at the outer end of the second tube to receive the outer pin, the arrangement anchoring the outer end of the spring and allowing movement of the mast as it flexes in the wind by telescoping of the second tube within the first, any tendency to misalignment of the first and second tube on such flexing being absorbed by the rose joints.

15. A device as claimed in claim 14 in which the outer pin is releasably anchored to said other mast so that it can be released and turned to pretension the spring then locked on said other mast to fix the pretension.

16. A sail device as claimed in claim 14 including means to lock the reefer mechanism, said means comprising means to prevent undesired rotation of the second tube.

17. A sail device as claimed in claim 16 in which a wheel is attached to the second tube;
    a plurality of indents in the wheel;
    reciprocable means to engage and release the indents to brake or release the wheel.

18. A sail device as claimed in claim 17 in which the reciprocable means comprises a solenoid having shaft extending from it;
    a catch on the shaft to engage the wheel.

19. A sail device as claimed in claim 1 including means to lock the reefer mechanism.

20. A sail device as claimed in claim 19 including an electrical circuit able only to drive an electrical motor to move the masts towards each other with the reefer mechanism locked.

21. A device as claimed in claim 1 including means to retract the sail downwardly.

22. A device as claimed in claim 21 in which the means to retract the sail comprises:
    a pneumatic cylinder;
    a slider attached to the cylinder;
    arms pivotably attaching to the slider;
    pivotable linkages attaching the arms to said pair of masts;
    whereby extension and retraction of the cylinder retracts and extends the sail.

23. A device as claimed in claim 21 in which the means to retract the sail comprises a mechanical linkage.

24. A device as claimed in claim 23 in which the mechanical linkage comprises;
    a first lever to be gripped by the bicycle rider;
    a torque tube attached to the lever;
    a second lever attached to the torque tube;
    a third lever extending from the second layer;
    a slider attached to the third lever;
    arms pivotably attached to the slider;
    pivotable linkages attaching the arms to said pair of masts;
    whereby movement of the first lever extends and retracts the sail, transferring the movement to the first lever through the torque tube, second lever, third lever and the slider.

25. A device as claimed in claim 24 including means to lock the slider.

26. A device as claimed in claim 25 in which the means to lock the slider includes a pin;
    means to reciprocate the pin;
    openings in the slider to be engaged by the pin;
    whereby with the sail in a selected position the pin can be engaged in a hole in the slider to fix the slider and thus the sail in the selected position.

* * * * *